Nov. 12, 1935.  C. R. WASEIGE  2,020,748
CLUTCH
Filed Sept. 14, 1932
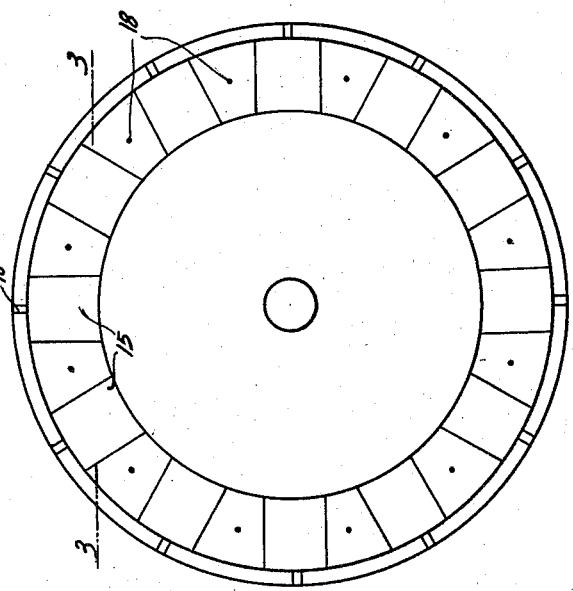
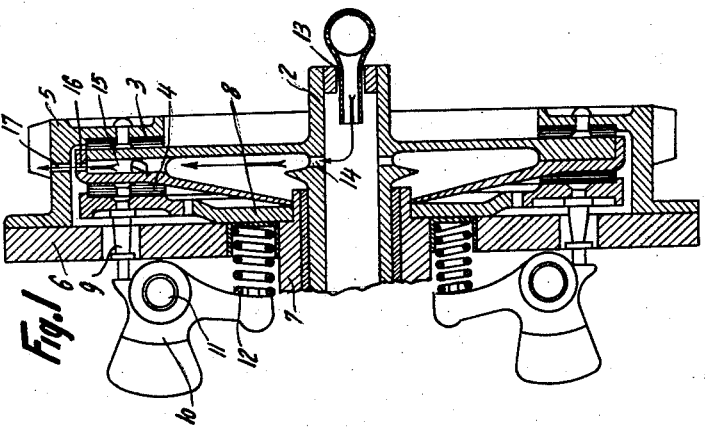
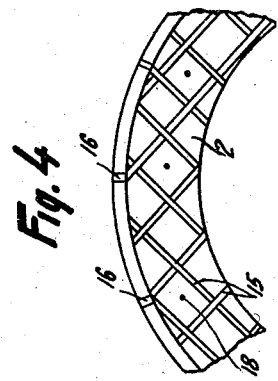
INVENTOR.
Charles Raymond Waseige
BY Warren T. Hunt
ATTORNEY.

Patented Nov. 12, 1935

2,020,748

UNITED STATES PATENT OFFICE 2,020,748

CLUTCH

Charles Raymond Waseige, Rueil-Malmaison, France, assignor, by mesne assignments, to Eclipse Aviation Corporation, East Orange, N. J., a corporation of New Jersey Application September 14, 1932, Serial No. 633,194
In France November 10, 1931

7 Claims. (Cl. 192—113)

This invention relates to clutches but more particularly to clutches of the progressive type such as utilized, for example, in the driving of compressors for aeroplanes.

It has been found that the linings of such clutches are rapidly destroyed due to the abnormal heat generated by the rubbing or frictional contact between the clutch elements during the periods when the two elements are rotating relatively.

It is the object of this invention to provide effective means whereby the destruction of clutch linings may be precluded.

In order that the invention may be clearly understood, reference is had to the accompanying drawing forming a part of this specification and in which:—

Fig. 1 is a vertical section through the device of this invention.

Fig. 2 is an elevation of a constructional form of the driving clutch member or disc.

Fig. 3 is a section at 3—3 on Fig. 2.

Fig. 4 is a sectional view of a modification of Figure 2.

Fixed to a driving shaft 2 and positioned between two friction faces 3 and 4 is a member D constituting the driving clutch disc. Friction face 3 is carried by a crown 5 which encompasses the member D and is fixed to a plate 6 whose hub 7 is mounted free on the shaft 2. Friction face 4 is supported on a plate 8 that is mounted on the hub 7 of plate 6. It is to be noted that friction face 3 and disc D are relatively fixed so that there is always a rubbing engagement between them while friction face 4 has a limited movement toward or away from the disc D. The friction faces 4 are progressively urged more firmly against the disc D, as the speed of the crown increases, by the weights 10 mounted at 11 and acting through the stems 9. Light contact between faces 4 and the disc D is always assured by the springs 12 which feebly urge the weights outwardly.

For the purpose of cooling the device, a liquid, such for instance as oil, is introduced into the hollow shaft 2 at 13; whereupon it passes under the action of centrifugal force through orifices 14 and through the hollow interior 15 of the disc D. Graduated openings 16 permit the cooling medium to pass out of the disc and at the same time permit the quantity of medium to be controlled. After having traversed the disc D, the medium may be withdrawn from the clutch through openings 17 in the crown 5.

The hollow disc D may be constructed as illustrated in Figs. 1–3 by joining together two discs 1 and 2; the surface of contact of at least one of them being provided with cavities 15. The two discs may be assembled for example by electrically welding them at points 18 or in any other suitable manner.

Fig. 4 shows another form that the discs 1 and 2 may take, wherein there is provided on one or both discs a series of intersecting grooves.

It is to be understood that the invention is not to be limited to the particular embodiments in connection with which it has been described but only by the scope of the claims appended hereto.

What is claimed is:

1. In a clutch mechanism, a rotary shaft, a hollow clutch member comprising a central conical section and a peripheral flat section, the latter designed to be engaged by friction faces, means to introduce a cooling liquid through the shaft to said conical section and means comprising flutes on said flat section for withdrawing the liquid from said member.

2. In a clutch mechanism, a rotary shaft, a hollow clutch member, a second clutch member encompassing said hollow clutch member and carrying friction faces designed to engage therewith, inlet means to introduce a cooling liquid through the shaft to said first member and radial outlet means passing through the periphery of the second clutch member to withdraw the medium from said second member, whereby heat generated at the friction faces will be dissipated, said inlet and said outlet means being positioned in the same radial plane.

3. In a clutch mechanism, a rotary shaft having a housing secured thereto, a second rotary shaft, a hollow disk secured to the second shaft, friction members within the housing on opposite sides of the hollow disk for connecting the disk to the housing, means forming passageways from the interior of the disk to the exterior thereof, said passageways terminating on the disk periphery, means forming an axial passageway through the second shaft, inlet means connecting the shaft passageway with the interior of the disk, outlet means from the disk, and means forming outlet passageways from the housing, said inlet means, said outlet means and said outlet passageways being positioned in the same radial plane.

4. In a clutch mechanism, a rotary shaft having a housing secured thereto, a second rotary shaft, a hollow disk secured to the second shaft, friction members within the housing on opposite sides of the hollow disk for connecting the disk to the housing, means forming passageways from the interior of the disk to the exterior thereof, said passageways terminating on the disk periphery, means forming an axial passageway through the second shaft, means connecting the shaft passageway with the interior of the disk, and means forming outlet passageways from the housing, said housing outlet means comprising a series of openings arranged in a plane substantially coincident with the plane of the passageways which terminate on the disk periphery.

5. In a clutch mechanism, a rotary shaft, a second rotary shaft, a hollow disk secured to first of said shafts, friction members on opposite sides of said disk for connecting the disk to the second rotary shaft, means forming an axial liquid passageway through the first shaft, means connecting the passageway with the interior of the disk, and said disk comprising two integrally joined members having contiguous peripheral faces, one of which is provided with a series of intersecting grooves extending from the disk periphery to the hollow interior thereof, said grooves constituting conduits for the circulation of liquid through the disk, a housing connected to the second rotary shaft and enclosing said disk, and said housing having outlet openings therein positioned in the plane of the grooves.

6. In a clutch mechanism, driving and driven members having friction faces thereon, an axial conduit in one member adapted to introduce a cooling medium internally of the member, radial outlet means in the first member and radial outlet conduit means in the second member positioned in the plane of the first mentioned member permitting withdrawal of the medium through the second member, and said radial conduits being extended through the periphery of the second member whereby the cooling medium passes through both members in a radial direction.

7. In a clutch mechanism, a hollow driving member, a hollow clutch member fixed to the shaft, a second clutch member encompassing the first mentioned member and having friction disks engaging the first member, said hollow member having a passageway through the portion thereof in engagement with the disks, inlet means for introducing a cooling medium to the first member, and outlet means for withdrawing the cooling medium through the second member, said inlet means, said passageway and said outlet means being positioned in the same radial plane.

CHARLES RAYMOND WASEIGE.